United States Patent [19]
Stenger-Smith et al.

[11] Patent Number: 5,904,990
[45] Date of Patent: *May 18, 1999

[54] AMINO FUNCTIONAL POLY (PARA-PHENYLENE VINYLENE)S AS PROTECTIVE COATINGS

[75] Inventors: John D. Stenger-Smith; Melvin H. Miles; William P. Norris; John Nelson; Peter Zarras; John W. Fischer; Andrew P. Chafin, all of Ridgecrest, Calif.

[73] Assignee: The United States of America as represented by the Secretary of the Navy, Washington, D.C.

[ * ] Notice: This patent is subject to a terminal disclaimer.

[21] Appl. No.: 09/046,848

[22] Filed: Mar. 13, 1998

Related U.S. Application Data

[63] Continuation-in-part of application No. 08/863,884, May 28, 1997, abandoned.

[51] Int. Cl.⁶ .......................... B32B 15/04; B32B 15/08; B32B 27/00
[52] U.S. Cl. .................. 428/457; 106/14.05; 252/388; 252/390; 252/395; 252/396; 252/500; 428/411.1; 428/461; 428/500; 528/373; 528/377; 528/391; 528/396; 528/481; 528/503

[58] Field of Search .................... 106/14.05; 252/388, 252/390, 395, 396, 500; 528/373, 377, 391, 396, 481, 503; 428/457, 461, 500, 411.1

[56] References Cited

U.S. PATENT DOCUMENTS

| | | | |
|---|---|---|---|
| 5,578,699 | 11/1996 | Stenger-Smith et al. | 528/373 |
| 5,585,522 | 12/1996 | Stenger-Smith et al. | 564/442 |
| 5,587,488 | 12/1996 | Stenger-Smith et al. | 549/59 |
| 5,604,292 | 2/1997 | Stenger-Smith et al. | 526/281 |

*Primary Examiner*—Anthony Green
*Attorney, Agent, or Firm*—Gregory M. Bokar; David S. Kalmbaugh

[57] ABSTRACT

Until recently, conducting polymers have been used as protective coatings. Although these types of polymers appear to be effective in most cases, problems have resulted when attempting to bind these polymers to an aluminum surface. The polymers of this invention adhere extremely well to aluminum and aluminum alloys and thus, provide a very effective form of corrosion protection.

24 Claims, 1 Drawing Sheet

Potentiostatic electrochemical studies of anodized aluminum plates

Potential/V vs.Ag/AgCl

—□— Open squares-Uncoated plate (6 months)

—○— Open circles-Coated plates(6 months)

····◨···· Half squares-Uncoated plate (one month)

—△— Open triangles-Coated plate(one month)

AMINO FUNCTIONAL POLY (PARA-PHENYLENE VINYLENE)S AS PROTECTIVE COATINGS

CROSS-REFERENCE TO RELATED APPLICATION

This application is a Continuation-in-Part application, filed under 37 CFR 1.53(b), of application Ser. No. 08/863,884 filed May 28, 1997, now abandoned.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

Conducting polymers have been used as protective coatings. Although these types of polymers appear to be effective in most cases, problems have resulted when attempting to bind these polymers to an aluminum surface. The polymers of this invention adhere extremely well to aluminum and thus, provide a very effective form of corrosion protection.

2. Description of the Prior Art

Conducting polymers are used as replacements for metals because the conducting polymers have potentially unique and/or superior properties compared to anodization and chrome conversion coatings. Furthermore, and of ever-increasing importance, some metals are toxic and in numerous instances have found to cause considerable damage to the environment. Therefore, the discharge of these substances is being closely monitored if not banished entirely.

There are several proposed mechanisms for corrosion protection, one or more of which could be occurring at any time. The first is a simple galvanic process by which the polymer has a lower oxidation potential than the metal it is protecting resulting in the preferential oxidation of the polymer. Since oxidized polymers are usually insoluble and do not dissolve away as zinc does, corrosion protection with conducting polymers lasts longer than a conventional galvanic coating such as zinc.

Another proposed mechanism for corrosion protection occurs when the polymer reacts with the surface of the metal, requiring that the polymer have an oxidation potential higher than that of the metal. The surface of the metal reacts with the polymer and forms a passivating layer which inhibits further corrosion by either setting up a barrier or by changing the surface potential or both.

Current methods of corrosion protection, i.e. zinc, do not last very long (usually less than 2 years) and/or are coming under increased scrutiny by the Environmental Protection Agency. For example, the use of chromium and cadmium for anti-corrosion coatings will soon be banned. Current mechanisms for corrosion protection include the use of a sacrificial electrode, such as a zinc coating, which will corrode (oxidize) in the place of the substrate. One major limitation in utilizing a sacrificial electrode is that the coatings do not last very long. The oxidized zinc metal dissolves or easily becomes scaled when subjected to water or moisture. Therefore, environmental concerns arise since toxic metals are being released.

Barrier coatings such as epoxy are currently being employed, but are not very robust especially when a pit in the coating has been formed. Once a pit forms, the corrosive species attacks the underlying metal and, thereby, increases the exposed surface, accelerating the corrosion process.

The corrosion inhibiting properties of conducting polymers was suggested by MacDiarmid in 1985 (MacDiarmid, A. G., "Short Course on Electrically Conductive Polymers", New Paltz, N.Y., 1985). Initial studies on the protection of metal surfaces against corrosion by conducting polymers was reported in the literature that same year (Ref: DeBerry, D. W., J. Electrochem. Soc, 132, 1022, (1985)). Much of the work on corrosion protection has focused on polyaniline (PANI), but also has been extended to other conjugated polymers.

Corrosion occurs by oxidation of a metallic surface by a medium to produce oxides and hydroxides. As these form, soluble species are produced, the surface pits increasing its surface area and the rate of decomposition accelerates until the surface is completely covered with scale or is totally corroded. As mentioned previously, one way to provide corrosion protection is to coat the metal with a barrier to prevent the reactive species from reaching the surface. Galvanization with zinc (or other metal with low enough oxidation potential) prevents corrosion via the creation of an interfacial potential at the metal:zinc interface. The zinc will corrode preferentially, while the reactive species may come in contact with the metal, the increased oxidation potential causes the metal to be unreactive, thereby, inhibiting the corrosion process.

Prior studies utilizing PANI as a corrosion protection coating shows that it works quite well. In fact, exposed metal surfaces adjacent to conducting polymer coatings (scratches or edges) are unreactive to corrosion as reported by Thompson and coworkers (refs: Baughman, R. H. et. al. Journal of Chemical Society, Chem. Comm. 49, 1977 and Nowak, R. J. et.al., Journal Chemical Society, Chem. Comm. Comm. 9, 1977). The corrosion protection properties of PANI on aluminum have also been studied. There has been some success in showing that PANI provides corrosion protection in the short term i.e. 7 days. R. Racicot, R. L. Clark, H-B. Liu, S. C. Yang, Thin Film Conductive Polymers On Aluminum Surfaces: Interfacial Charge-Transfer and Anti-Corrosion Aspects, SPIE Proceedings, Optical and Photonic Applications of Electroactive and Conducting Polymers, Vol. 2528, Jul. 12–13, 1995 San Diego, Calif. However, in the long term, 1–6 months, PANI has been found to not adhere well to aluminum surfaces.

One disadvantage in utilizing PANI is that the corrosion protection ability is pH dependent. In acidic media, PANI coated mild steel coupons corrode 100 times slower than uncoated counterparts, while in pH 7 media, the PANI coated material corrodes 2 times slower (Ref: Lu, W-K, Elsenbaumer, R. L., Wessling, B., Synthetic Materials, 71, 2163 (1995)) and Wei, Y., Wang, J., Jia, X., Yeh, J-M., Spellane, P., Polymer 36(23), 4536 (1995)). This could be explained by the pH dependence of the structure of PANI. At low pH, the conducting emeraldine salt is the predominant form. At high pH, the non-conducting emeraldine base is the predominant form. It appears that the conducting form is required for the formation of the passivation layer.

In summary, the effectiveness of the corrosion protection is controlled by the type of polyaniline (emeraldine base versus emeraldine salt), the characteristics of the corrosion environment (acidic medium, aqueous sodium chloride, etc.) and by adhesion to the substrate. For optimum corrosion protection, it may be necessary to develop conducting polymers that do not have the pH dependence of conductivity that PANI has.

At present, some conducting polymers (in their neutral, non-conducting states) are soluble in organic solvents. Various types of surfactant counter-ions have been used with PANI to make the conducting form of polyaniline soluble in organic solvents. The results of this test are ongoing due to adhesion problems between the polymers and aluminum.

BRIEF SUMMARY OF THE INVENTION

One object of the present invention is to utilize amino functional poly(para- phenylene vinylene)s (PPVs) as protective coatings providing both film-forming and corrosion inhibiting properties. Amino functional PPVs have the following chemical structure:

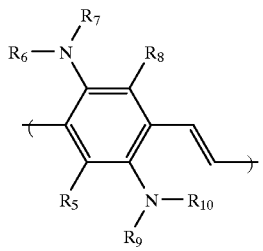

wherein R5 and R8 are independently selected from the group consisting of hydrogen, alkyl from 1 to 22 carbon molecules, alkoxy from 1 to 22 carbon molecules, nitro, halogen, cyano, cyano ester, ester, sulfonate groups, silyl, perfluoro alkyl, amino, alkyl amino and dialkyl amino; and wherein R6, R7, R9 and R10 are independently selected from the group consisting of hydrogen, alkyl from 1 to 22 carbon molecules, alkoxy from 1 to 22 carbon molecules, nitro, halogen, cyano, cyano ester, ester, sulfonate groups, silyl and perfluoro alkyl.

An effective amount of amino functional PPV which can be used as a protective coating ranges from about 0.1–200 microns. A more preferred range for an effective amount of protective coating is about 0.1–50 microns. A most preferred range for an effective amount of protective coating is about 0.1–5 microns. The amino functional PPVs function as a protective coating in two ways. First, via a barrier method in which the reactive species cannot reach the surface. Second, by combining with the surface to form a passivation layer.

Another object of the invention is to utilize the amino functional PPV compounds as corrosion inhibitors for metals and especially as a corrosion inhibitor for aluminum and aluminum alloys.

The synthesis of amino substitutents into the PPV backbone is outlined in U.S. Pat. Nos. 5,578,699, 5,585,522, 5,587,488 and 5,604,292.

DETAILED DESCRIPTION OF THE INVENTION

Figure 1:
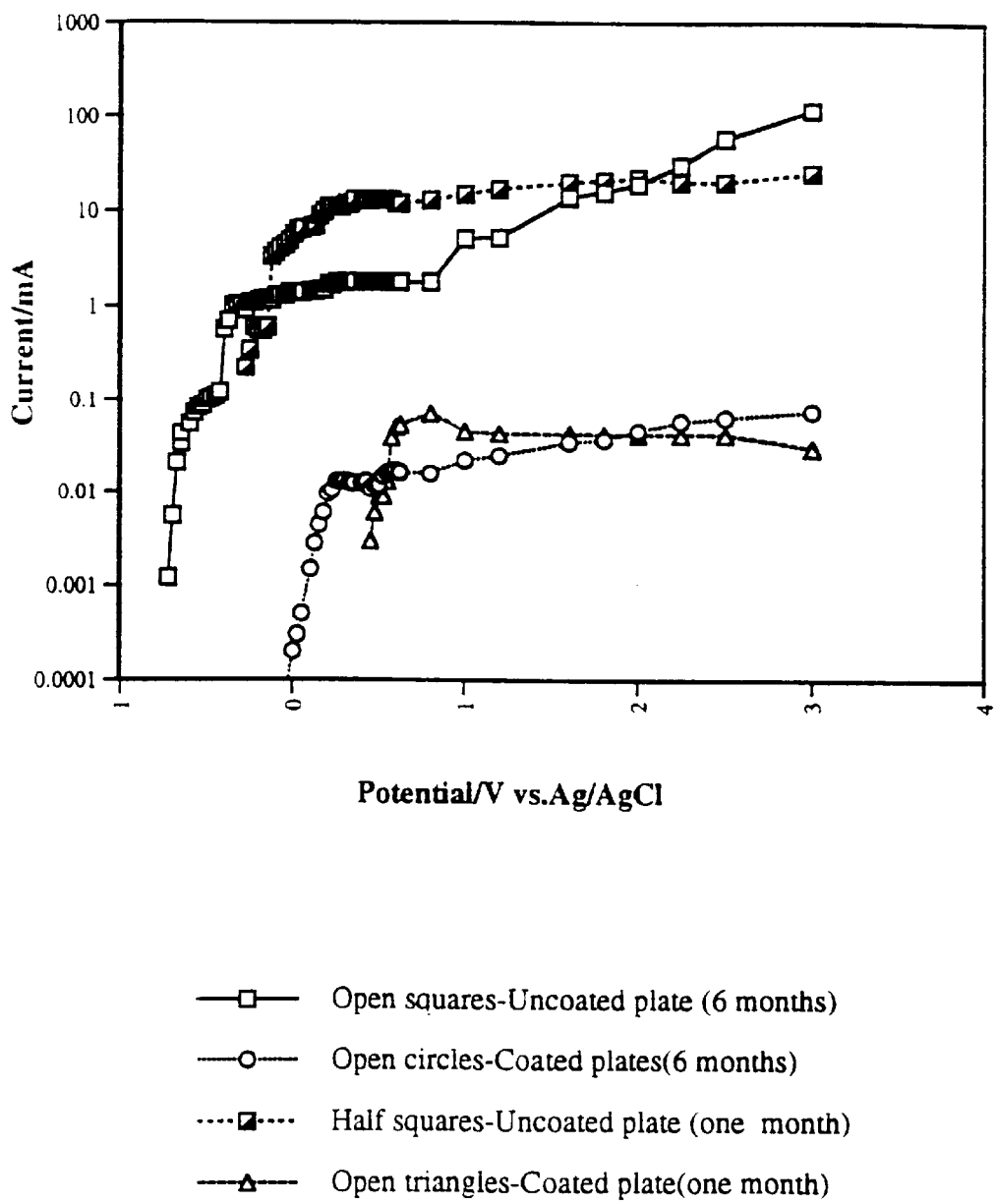
FIG. 1—Electrochemical Behavior of Coated and Uncoated Anodized Aluminum T3 Plates After a 1 and 6 Month Immersion Study Trial.

The following data illustrates that amino functional PPV polymer coated aluminum has a substantial reduction in the amount of pitting and corrosion compared to aluminum coated with other types of polymers.

EXAMPLE 1

Immersion studies were performed on aluminum T3 plates (5.1×5.1×0.15 cm) and type II anodized aluminum. One of the plates was coated with bis(dialkylamino) PPV (0.5 microns) and the other was uncoated. Each plate had a 4 cm scribe mark on it. The films were immersed in isotonic water (70 g of sea salt dissolved in 1200 ml of deionized water) at pH 8.1 for 24 hours and then exposed to the air for another 24 hours. This cycle was allowed to continue for 30 days. At the conclusion of the study a microscopic evaluation was completed. The results of this evaluation indicated severe pitting in the uncoated sample. Furthermore, it was very difficult to determine the location of the scribe mark on the plate because of the extreme rate of corrosion. On the coated sample there was very minimal corrosion and recognition of the scribe mark was apparent.

EXAMPLE 2

Immersion studies were performed on aluminum T3 plates (5.1×5.1×0.15 cm) and type II anodized aluminum. One of the plates was coated with bis(dialkylamino) PPV (0.5 microns) and the other was uncoated. The corrosion study was allowed to run side-by-side on each sample for a total of 6 months. The films were immersed in isotonic water (70 g of sea salt dissolved in 1200 ml of deionized water) at pH 8.1 for 24 hours and then exposed to the air for another 24 hours. Both potentiostatic and galvanostatic electrochemical studies were performed versus Ag/AgCl after 1 month and then again after 6 months. Both the potentiostatic and galvanostatic results were very similar. Only the potentiostatic results are reported (FIG. 1).

The results of the tests are as follows: For the aluminum T3 plates, the results from the alternate immersion studies indicated significant reduction in corrosion for the polymer coated sample even in the area with the scribe. The study with the anodized aluminum T3 plates indicated some reduction in corrosion for the polymer coated sample. The conducting polymer film still showed excellent adhesion after the immersion tests.

FIG. 1 shows the results of the potentiostatic studies on the coated and uncoated anodized aluminum plates after both 1 month and 6 months.

The electrochemical studies indicated a maximum current of 25 mA at 3.00 V vs. Ag/Cl for the uncoated anodized T3 plate. The potentiostatic study yielded a total charge of 1.380 coulombs. Close examination of the plate showed a few isolated regions on the edges of the plate to be main contributors to the anodic current. Specifically, there was no measurable current from −0.6 V to −0.3 V, with pitting potential around −0.28V (untreated T3 has a pitting potential of about −0.6V). The results for the polymer coated plate indicate a pitting potential near 0.525V. The anodic current increased only slightly to 0.071 mA at 0.8V, and then decreased. There was no further increase in current observed out to 3.0V. The potentiostatic study yielded a total current of 0.00358 coulombs. This is quantitative evidence that PPVs can be used to prevent corrosion on aluminum plates.

Since various changes and modifications can be made in the invention without departing from the spirit of the invention, the invention is not to be taken as limited except by the scope of the appended claims.

What is claimed is:

1. A protective layer composition applied to a surface providing both film-forming and corrosion inhibiting properties having the chemical formula:

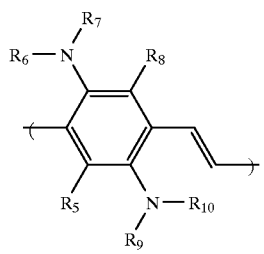

wherein $R_5$ and $R_8$ are independently selected from the group consisting of hydrogen, an alkyl group having from 1 to 22 carbon molecules, an alkoxy group having from 1 to 22 carbon molecules, nitro, halogen, cyano, cyano ester, ester, sulfonate groups, silyl, perfluoro alkyl, amino, alkyl amino and dialkyl amino;

wherein $R_6$, $R_7$, $R_9$ and $R_{10}$ are independently selected from the group consisting of hydrogen, an alkyl group having from 1 to 22 carbon molecules, an alkoxy group having from 1 to 22 carbon molecules, nitro, halogen, cyano, cyano ester, ester, sulfonate groups, silyl and perfluoro alkyl;

wherein the average molecular weight of the chemical formula ranges from about 500 to about 2,000,000; and wherein said protective layer composition is present on said surface in a thickness ranging from about 0.1 to about 200 microns.

2. A protective layer composition as in claim 1 wherein said protective layer composition is present on said surface in a thickness ranging from about 0.1 to about 50 microns.

3. A protective layer composition as in claim 1 wherein said protective layer composition is present on said surface in a thickness ranging from about 0.1 to about 5 microns.

4. A protective layer composition applied to a surface as in claim 1, wherein said surface is a metal.

5. A protective layer composition applied to a surface as in claim 1, wherein said surface is aluminum.

6. A protective layer composition applied to a surface as in claim 1, wherein said surface is an aluminum alloy.

7. A protective layer composition applied to a surface as in claim 1, wherein said chemical compound is selected from the group consisting of poly (2-(N,N-dimethylamino) phenylene vinylene), poly (2,5-bis-(N,N-dimethylamino) phenylene vinylene), poly (2,3,5-tris-(N,N dimethylamino) phenylene vinylene), poly (2,3,5,6-tetrakis-(N,N-dimethylamino) phenylene vinylene), poly (2-amino phenylene vinylene), poly (2-(N-methylamino)-5-(N-propyl-N-butylamino) phenylene vinylene), poly (2-(N,N-dimethylamino)-5-nitro phenylene vinylene), poly (2-(N,N-dimethylamino) 5-cyano-6 methoxy phenylene vinylene), poly (2,5 bis(N-methyl-N-propylamino) phenylene vinylene), poly (2,5 bis(N-methyl-N-hexylamino) phenylene vinylene) and poly (2-(N-hydroxymethyl, N-methylamino)-3-hexyl-5-octadecyl-6-perfluorpentyl phenylene vinylene).

8. A protective layer composition applied to a surface as in claim 7, wherein said protective layer composition is present on said surface in a thickness ranging from about 0.1 to about 50 microns.

9. A protective layer composition applied to a surface as in claim 7, wherein said protective layer composition is present on said surface in a thickness ranging from about 0.1 to about 5 microns.

10. A protective layer composition applied to a surface as in claim 7, wherein said surface is a metal.

11. A protective layer composition applied to a surface as in claim 7, wherein said surface is aluminum.

12. A protective layer composition applied to a surface as in claim 7, wherein said surface is an aluminum alloy.

13. A protective layer composition applied to a surface as in claim 1, wherein one or both amine groups is quarternized by any of the reagents selected from the group consisting of hydrogen halides, alkyl and aryl halides having 1 to 22 carbon atoms, alkyl sulfonates having 1 to 22 carbon atoms, alcohols having 1 to 22 carbon atoms, acetic acids, carboxylic acids, and sulfonic acids.

14. A protective layer composition applied to a surface as in claim 13, wherein said protective layer composition is present on said surface in a thickness ranging from about 0.1 to about 50 microns.

15. A protective layer composition applied to a surface as in claim 13 wherein said protective layer composition is present on said surface in a thickness ranging from about 0.1 to about 5 microns.

16. A protective layer composition applied to a surface as in claim 13, wherein said surface is a metal.

17. A protective layer composition applied to a surface as in claim 13, wherein said surface is aluminum.

18. A protective layer composition applied to a surface as in claim 13, wherein said surface is an aluminum alloy.

19. A protective layer composition applied to a surface as in claim 12, wherein said chemical compound is selected from the group consisting of poly (2-(N,N-dimethylamino) phenylene vinylene), poly (2,5--bis-(N,N-dimethylamino) phenylene vinylene), poly (2,3,5-tris(N,N dimethylamino) phenylene vinylene), poly (2,3,5,6-tetrakis-(N,N-dimethylamino) phenylene vinylene), poly (2-amino phenylene vinylene), poly (2-(N-methylamino)-5-(N-propyl-N-butylamino) phenylene vinylene), poly (2-(N,N-dimethylamino)-5-nitro phenylene vinylene), poly (2-(N,N-dimethylamino) 5-cyano-6 methoxy phenylene vinylene), poly (2,5-bis(N-methyl-N-propylamino) phenylene vinylene), poly (2,5- bis(N-methyl-N-hexylamino) phenylene vinylene) and poly (2-(N-hydroxymethyl, N-methylamino)-3-hexyl-5-octadecyl-6-perfluorpentyl phenylene vinylene).

20. A protective layer composition applied to a surface as in claim 19, wherein said protective layer composition is present on said surface in a thickness ranging from about 0.1 to about 50 microns.

21. A protective layer composition applied to a surface as in claim 19 wherein said protective layer composition is present on said surface in a thickness ranging from about 0.1 to about 5 microns.

22. A protective layer composition applied to a surface as in claim 19, wherein said surface is a metal.

23. A protective layer composition applied to a surface as in claim 19, wherein said surface is aluminum.

24. A protective layer composition applied to a surface as in claim 19, wherein said surface is an aluminum alloy.

* * * * *